United States Patent
Rofougaran et al.

(10) Patent No.: US 8,942,646 B2
(45) Date of Patent: *Jan. 27, 2015

(54) METHOD AND SYSTEM FOR A 60 GHZ COMMUNICATION DEVICE COMPRISING MULTI-LOCATION ANTENNAS FOR PSEUDO-BEAMFORMING

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 637 days.

This patent is subject to a terminal disclaimer.

(21) Appl. No.: 12/895,528

(22) Filed: Sep. 30, 2010

(65) Prior Publication Data

US 2012/0083225 A1    Apr. 5, 2012

(51) Int. Cl.
  *H04B 7/06*    (2006.01)
  *H04B 7/02*    (2006.01)

(52) U.S. Cl.
  CPC .................................... *H04B 7/024* (2013.01)
  USPC ........................................................ 455/101

(58) Field of Classification Search
  USPC ................................................... 455/77, 101
  See application file for complete search history.

(56) References Cited

U.S. PATENT DOCUMENTS

| | | | | |
|---|---|---|---|---|
| 5,280,472 A * | 1/1994 | Gilhousen et al. | ............. | 370/335 |
| 5,461,646 A * | 10/1995 | Anvari | ............................ | 375/347 |
| 5,519,691 A * | 5/1996 | Darcie et al. | .................... | 370/331 |
| 5,533,011 A * | 7/1996 | Dean et al. | ..................... | 370/342 |
| 5,781,847 A * | 7/1998 | Clarke et al. | ..................... | 455/69 |
| 5,802,173 A * | 9/1998 | Hamilton-Piercy et al. | . . | 379/56.2 |
| 5,805,983 A * | 9/1998 | Naidu et al. | ................. | 455/67.16 |
| 5,901,144 A * | 5/1999 | Maki et al. | ..................... | 370/330 |
| 5,969,837 A * | 10/1999 | Farber et al. | .................. | 379/56.2 |
| 6,023,458 A * | 2/2000 | Tweedy et al. | ................. | 370/328 |
| 6,070,063 A * | 5/2000 | Yoshizawa et al. | ......... | 455/234.1 |
| 6,405,018 B1 * | 6/2002 | Reudink et al. | ................. | 455/20 |
| 6,449,477 B1 * | 9/2002 | Weissman | ................... | 455/422.1 |
| 6,801,767 B1 * | 10/2004 | Schwartz et al. | ........... | 455/426.2 |
| 7,426,231 B1 * | 9/2008 | Dorfman | ....................... | 375/130 |
| 7,460,082 B2 * | 12/2008 | Li et al. | .......................... | 343/893 |
| 7,561,904 B2 * | 7/2009 | Lagnado | ..................... | 455/575.7 |
| 7,640,035 B2 * | 12/2009 | Jang et al. | ...................... | 455/551 |
| 7,787,854 B2 * | 8/2010 | Conyers et al. | ............... | 455/403 |
| 8,005,050 B2 * | 8/2011 | Scheinert et al. | .............. | 370/335 |
| 8,010,116 B2 * | 8/2011 | Scheinert | ....................... | 455/443 |
| 8,159,399 B2 * | 4/2012 | Dorsey et al. | .................. | 343/702 |
| 2001/0046840 A1 * | 11/2001 | Kim | ................................... | 455/7 |

(Continued)

*Primary Examiner* — Gennadiy Tsvey
(74) *Attorney, Agent, or Firm* — Oblon, Spivak, McClelland, Maier & Neustadt, L.L.P.

(57) ABSTRACT

Methods and systems for a 60 GHz communication device comprising multi-location antennas for pseudo-beamforming are disclosed and may include configuring antennas in RF modules for beamforming transmitted signals. Each of the RF modules may receive IF signals via coaxial lines. The beamformed RF signals may be transmitted via the antennas to external devices. The RF signals may be generated from IF signals from baseband signals. The RF modules may be configured utilizing a processor in the wireless communication device. The RF signals may be transmitted to a display device. Control signals for the RF devices may be communicated utilizing the coaxial lines. The RF devices may be selected for the beamforming based on a direction to a receiving device. The beamforming may include adding a phase shift in upconverting the IF signals to the RF signals, which may include 60 GHz signals.

22 Claims, 6 Drawing Sheets

(56) References Cited

U.S. PATENT DOCUMENTS

| | | | |
|---|---|---|---|
| 2003/0045284 A1* | 3/2003 | Copley et al. | 455/426 |
| 2004/0051598 A1* | 3/2004 | Vann et al. | 332/103 |
| 2004/0121810 A1* | 6/2004 | Goransson et al. | 455/562.1 |
| 2007/0149250 A1* | 6/2007 | Crozzoli et al. | 455/562.1 |
| 2007/0218845 A1* | 9/2007 | Efland et al. | 455/84 |
| 2007/0280370 A1* | 12/2007 | Liu | 375/267 |
| 2008/0014948 A1* | 1/2008 | Scheinert | 455/444 |
| 2008/0058018 A1* | 3/2008 | Scheinert | 455/562.1 |
| 2009/0061940 A1* | 3/2009 | Scheinert et al. | 455/562.1 |
| 2009/0258652 A1* | 10/2009 | Lambert et al. | 455/446 |
| 2009/0273517 A1* | 11/2009 | Thiesen et al. | 342/372 |
| 2009/0316609 A1* | 12/2009 | Singh | 370/280 |
| 2010/0087227 A1* | 4/2010 | Francos et al. | 455/562.1 |
| 2010/0128712 A1* | 5/2010 | Cordeiro | 370/345 |
| 2010/0202557 A1* | 8/2010 | Harris | 375/295 |
| 2011/0063169 A1* | 3/2011 | Chen et al. | 342/368 |
| 2011/0135013 A1* | 6/2011 | Wegener | 375/241 |
| 2011/0141895 A1* | 6/2011 | Zhang | 370/235 |

* cited by examiner

METHOD AND SYSTEM FOR A 60 GHZ COMMUNICATION DEVICE COMPRISING MULTI-LOCATION ANTENNAS FOR PSEUDO-BEAMFORMING

CROSS-REFERENCE TO RELATED APPLICATIONS/INCORPORATION BY REFERENCE

U.S. patent application Ser. No. 12/895,503 filed on Sep. 30, 2010;
U.S. patent application Ser. No. 12/895,514 filed on Sep. 30, 2010;
U.S. patent application Ser. No. 12/895,520 filed on Sep. 30, 2010;
U.S. patent application Ser. No. 12/895,547 filed on Sep. 30, 2010;
U.S. patent application Ser. No. 12/895,537 filed on Sep. 30, 2010; and
U.S. patent application Ser. No. 12/895,573 filed on Sep. 30, 2010.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for a 60 GHz communication device comprising multi-location antennas for pseudo-beamforming.

BACKGROUND OF THE INVENTION

In 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence requirements. The communications taking place in this band are often referred to as '60 GHz communications'. With respect to the accessibility of this part of the spectrum, 60 GHz communications may be somewhat similar to other forms of unlicensed spectrum use, for example Wireless LANs or Bluetooth in the 2.4 GHz ISM bands. However, communications at 60 GHz may be significantly different in aspects other than accessibility. For example, 60 GHz signals may possess markedly different communications channel and propagation characteristics, at least due to the fact that 60 GHz radiation is partly absorbed by oxygen in the air, thereby leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a 60 GHz communication device comprising multi-location antennas for pseudo-beamforming, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
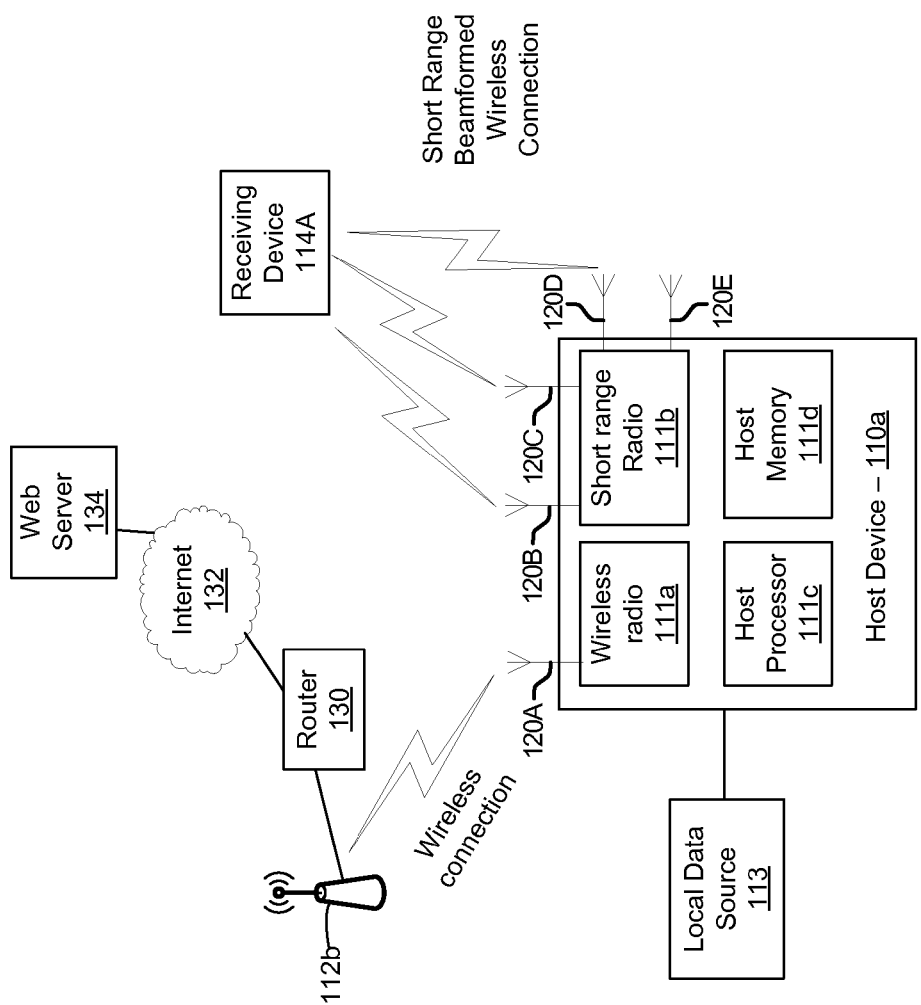
FIG. 1A is a diagram illustrating an exemplary wireless communication system, in accordance with an embodiment of the invention.

Certain aspects of the invention may be found in a method and system for a 60 GHz communication device comprising multi-location antennas for pseudo-beamforming. Exemplary aspects of the invention may comprise configuring a plurality of antennas in the plurality of remote RF modules for beamforming transmitted signals. Each of the plurality of remote RF modules may receive IF signals via one or more coaxial lines. The beamformed RF signals may be transmitted via the plurality of antennas to one or more devices that are external to the wireless communication device. The IF signals in the one or more coaxial lines may be tapped at taps coupled to the plurality of remote RF modules. The RF signals may be generated from IF signals from one or more baseband signals. The plurality of remote RF modules may be configured utilizing a processor in the wireless communication device. The baseband signals may comprise one or more of video data, streamed Internet data, or data from a local data source. The beamformed RF signals may be transmitted to a display device. Control signals for the plurality of remote RF devices may be communicated utilizing the one or more coaxial lines. The control signals may be utilized to, for example, configure one or more of the plurality of antennas in one or more of the plurality of remote RF modules for beamforming transmitted signals. The plurality of remote RF devices may be selected for the beamforming based on a direction to a receiving device for the transmitted beamformed RF signals. The beamforming may comprise adding a phase shift in upconverting the IF signals to the RF signals, which may comprise 60 GHz signals.

FIG. 1 is a diagram illustrating an exemplary wireless communication system, in accordance with an embodiment of the invention. Referring to FIG. 1, there is shown an access point 112b, a host device 110a, a local data source 113, a receiving device 114a, a router 130, the Internet 132 and a web server 134. The host device 110a, or computer, for example, may comprise a wireless radio 111a, a short-range radio 111b, a host processor 111c, a plurality of antennas 120A-120E, and a host memory 111d. There is also shown a wireless connection between the wireless radio 111a and the access point 112b, and a short-range wireless connection between the short-range radio 111b and the receiving device 114a.

The host device 110a may comprise a computer or set-top box device, for example, that may be operable to receive signals from data sources, process the received data, and communicate the processed data to receiving devices. Accordingly, the host device 110a may comprise processors, such as the host processor 111c, storage devices such as the host memory 111d, and communication devices, such as the wireless radio 111a and the short range radio 111b.

The wireless radio 111a may comprise suitable circuitry, logic, interfaces, and/or code that may be operable to communicate wireless signals to between the host device 110a and external devices, such as the access point 112b, for example. Accordingly, the wireless radio 111a may comprise amplifiers, mixers, analog-to-digital and digital-to-analog converters, phase-locked loops, and clock sources, for example, that enable the communication of wireless signals.

The short-range radio 111b may comprise suitable circuitry, logic, interfaces, and/or code that may be operable to communicate wireless signals over short distances. Accordingly, the frequency of transmission/reception may be in the 60 GHz range, which may enable short-range communications due to the attenuation of signals in air at this frequency. Similarly, the short-range radio 111b may comprise amplifiers, mixers, analog-to-digital and digital-to-analog converters, phase-locked loops, and clock sources, for example, that enable the communication of wireless signals.

The host processor 111c may comprise suitable circuitry, logic, interfaces, and/or code that may be operable to received control and/or data information, which may comprise programmable parameters, to determine an operating mode of the wireless radio 111a and the short-range radio 111b. For example, the host processor 111c may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the host memory 111d via the host processor 111c, for example. The information stored in host memory 111d may be transferred to the wireless radio 111a and/or the short-range radio 111b from the host memory 111d via the host processor 111c.

The host memory 111d may comprise suitable circuitry, logic, interfaces, and/or code that may be enabled to store a plurality of control and/or data information, including parameters needed to calculate frequencies and/or gain, and/or the frequency value and/or gain value. The host memory 111d may store at least a portion of the programmable parameters that may be manipulated by the host processor 111c.

The access point 112b may comprise suitable circuitry, logic, interfaces, and/or code that may be enabled to provide wireless signals to one or more devices within its range. The access point 112b may be coupled to the router 130, thereby enabling connection to the Internet for devices that are operable to communicate with the access point 112b.

The local data source 113 may comprise suitable circuitry, logic, interfaces, and/or code that may be enabled to communicate data to the host device 110a. For example, the local data source may comprise a DVD player, and MP3 player, and/or a set-top box.

The receiving device 114A may comprise suitable circuitry, logic, interfaces, and/or code that may be enabled to receive data communicated by the host device 110a via the short-range radio 111b. In an exemplary embodiment of the invention, the receiving device 114A may comprise an HDTV that may be operable to display HD video signals and playback associated audio signals.

The antennas 120A-120E may comprise suitable circuitry, logic, interfaces, and/or code that may be operable to transmit and/or receive wireless signals. For example, the antenna 120A may be operable to transmit and receive wireless signals between the access point 112b and the wireless radio 111a, and the antennas 120B-120E may be operable to communicate signals between the short range radio 111b and one or more external devices, such as the receiving devices 114A. The antennas 120A-120E may be individually enabled for beamforming capability.

The router 130 may comprise suitable circuitry, logic, interfaces, and/or code that may be enabled to communicate signals between the access point 112b and the Internet. In this manner, devices within range of the access point 112b may be enabled to connect to the Internet.

The web server 134 may comprise a remote server that may be operable to store content that may be accessed by the host device 110a via the Internet 132. For example, the web server 134 may comprise a movie provider server and may be operable to communicate a desired movie to the host device 110a via the Internet for display via the receiving device 114A.

Frequently, computing and communication devices may comprise hardware and software to communicate using multiple wireless communication standards. The wireless radio 111a may be compliant with a mobile communications standard, for example. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the host device 110a and the access point 112b. Once this connection is established, the streaming content from the Web server 134 may be received via the router 130, the access point 112b, and the wireless connection, and consumed by the computer or host device 110a.

It may be further desirable for the user of the host device 110a to communicate the streaming content to the receiving device 114a, which may comprise a TV or other type of display, for example. Accordingly, the user of the host device 110a may establish a short-range wireless connection with the receiving device 114a. Once the short-range wireless connection is established, and with suitable configurations on the computer enabled, the streaming content may be displayed by the receiving device 114a. In instances where such advanced communication systems are integrated or located within the host device 110a, the radio frequency (RF) generation may support fast-switching to enable support of multiple communication standards and/or advanced wideband systems like, for example, Ultrawideband (UWB) radio. Other applications of short-range communications may be wireless High-Definition TV (W-HDTV), from a set top box to a video display, for example. W-HDTV may require high data rates that may be achieved with large bandwidth communication technologies, for example UWB and/or 60-GHz communications.

In another embodiment of the invention, the local data source 113 may be operable to provide data to be displayed by the receiving device 114a via the host device 110a. For example, the local data source may comprise a DVD player or a digital video recorder. The local data source may communicate with the host device 110a via a wired connection or via a wireless connection, either directly with the host device 110a or via the access point 112b.

In an embodiment of the invention, the short range radio 111b may comprise a plurality of antennas and frequency up-conversion devices throughout the host device 110a for communicating high frequency RF signals. The short range radio 111b may comprise a baseband and IF stage with a single high power PA that may communicate IF signals over thin coaxial lines. Taps may be configured to couple the IF signals from the coaxial lines to the frequency up-conversion devices before being communicated to the plurality of antennas. In this manner, IF signals may be amplified by a single PA and subsequently up-converted to 60 GHz, for example, for transmission via a plurality of antennas without the need for multiple PAs with excessive power requirements.

By utilizing a plurality of up-conversion transmission/reception devices, each with one or more antennas, pseudo beamforming may be enabled, pseudo in that the beamforming may be configured in baseband and/or IF before being transmitted via coaxial lines to the RF modules for up-conversion. For example, a plurality of antennas, such as the antennas 120B-120E, may be enable to communicate with an external device, such as the receiving device 114A. In one embodiment of the invention, the signals communicated to each of the antennas 120B-120E may be processed at the RF modules driving each of the antennas such that pseudo beamforming results. For example, different phase shifts may be added at each RF module depending on proximity to the receiving device 114A to result in a uniform wavefront.

Figure 1B:
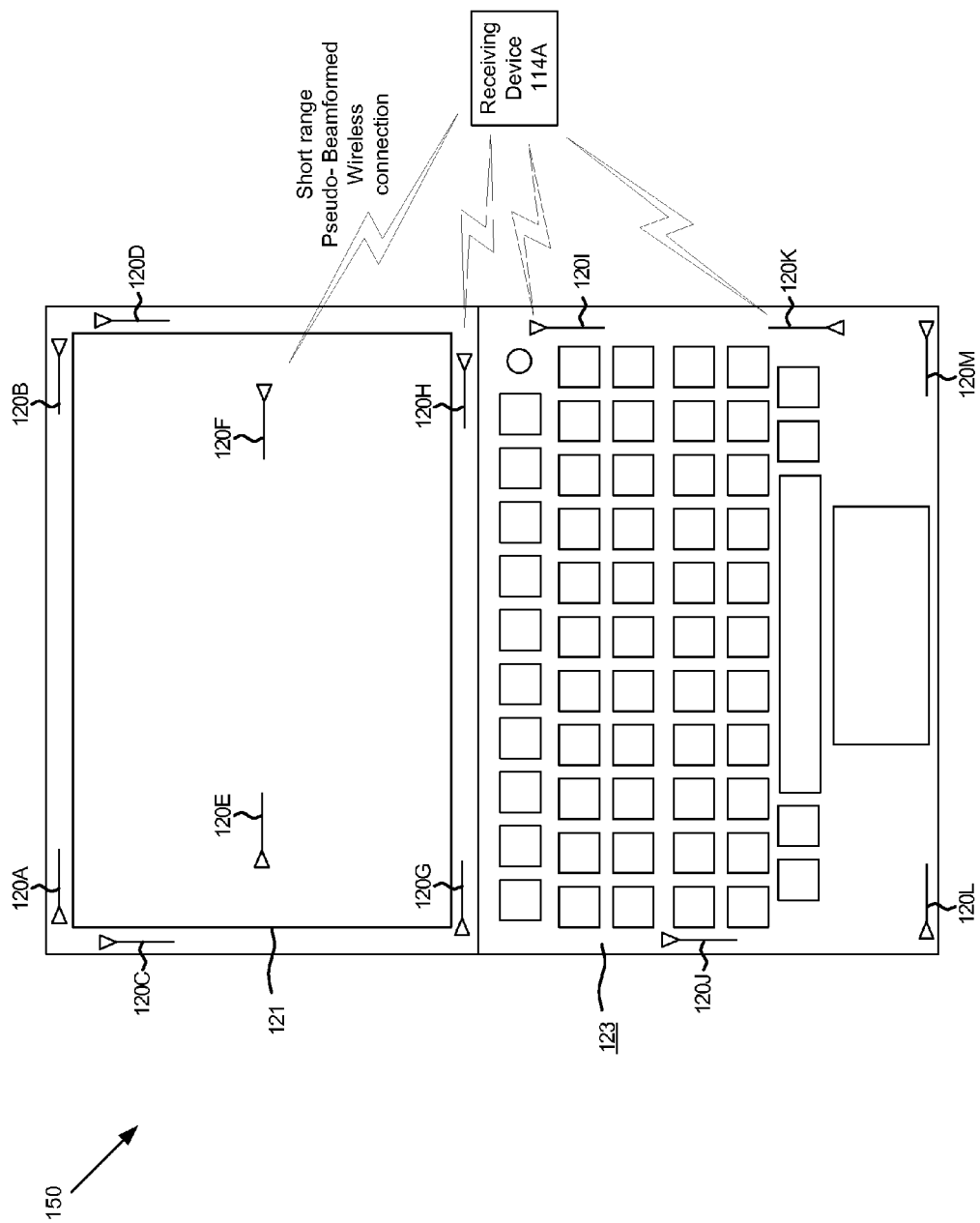
FIG. 1B is a block diagram illustrating a laptop computer with an exemplary 60 GHz beamforming system, in accordance with an embodiment of the invention.

FIG. 1B is a block diagram illustrating a laptop computer with an exemplary 60 GHz beamforming system, in accordance with an embodiment of the invention. Referring to FIG. 1B, there is shown a laptop computer comprising a display 121, keyboard 123, and a plurality of antennas 120A-120M.

The antennas 120A-120M may be substantially similar to the antennas 120A-120E described with respect to FIG. 1A, and may comprise antennas coupled to a plurality of remote RF devices throughout the laptop 150. In this manner, one or more antenna configurations may be enabled, depending on the location of the receiving device, such as the receiving device 114A, and the antenna configuration that results in the greatest signal strength, lowest bit error rate, highest data throughput, lowest latency, and/or the optimum of any other desired wireless communication characteristic.

The antennas 120A-120M may be coupled to remote RF devices throughout the laptop 150. The remote RF devices may receive IF signals from a baseband and IF module via thin coaxial lines, described with respect to FIG. 2, and may be operable to up-convert received IF signals to RF signals. In this manner, lower frequency signals may be communicated throughout the laptop 150 to the antennas that result in desired signal quality. This may enable a single high-power PA stage that amplifies the IF signals that are then up-converted to RF in the remote RF modules.

The configuration found to have the desired characteristics may be enabled to provide pseudo beamforming by communicating an IF signal to each of the RF modules driving the antennas in that configuration. Exemplary characteristics may comprise carrier to noise ratio (CNR), carrier to interference noise ratio (CINR), signal to noise ratio (SNR), signal to interference noise ratio (SINR), throughput, bit error rate (BER), packet error rate (PER), frame error rate (FER), quality of service (QoS), latency, and/or signal strength. By applying an appropriate phase delay at each RF module, for example, a uniform wavefront may result at the receiving device 114A.

In operation, a short-range pseudo beamformed wireless communication channel may be enabled between the laptop 150 and the receiving device 114A. A plurality of antenna configurations may be assessed for a desired performance characteristic, such as signal strength, bit error rate, data throughput, and/or latency, for example. A processor, such as the host processor 111c described with respect to FIG. 1C, may control the up-conversion and phase delay of the IF signals.

The remote RF device and antenna configuration that results in the desired performance, such as the antennas 120F, 120H, 120I, and 120K, for example, may then be enabled to receive IF signals via coaxial lines from a centrally located baseband and IF module, and up-convert the signals to RF before transmitting via the appropriate antennas 120F, 120H, 120I, and 120K. Each of the remote RF modules may also apply a phase shift in up-converting the IF signals to RF before transmitting via the antennas 120F, 120H, 120I, and 120K.

Figure 1C:
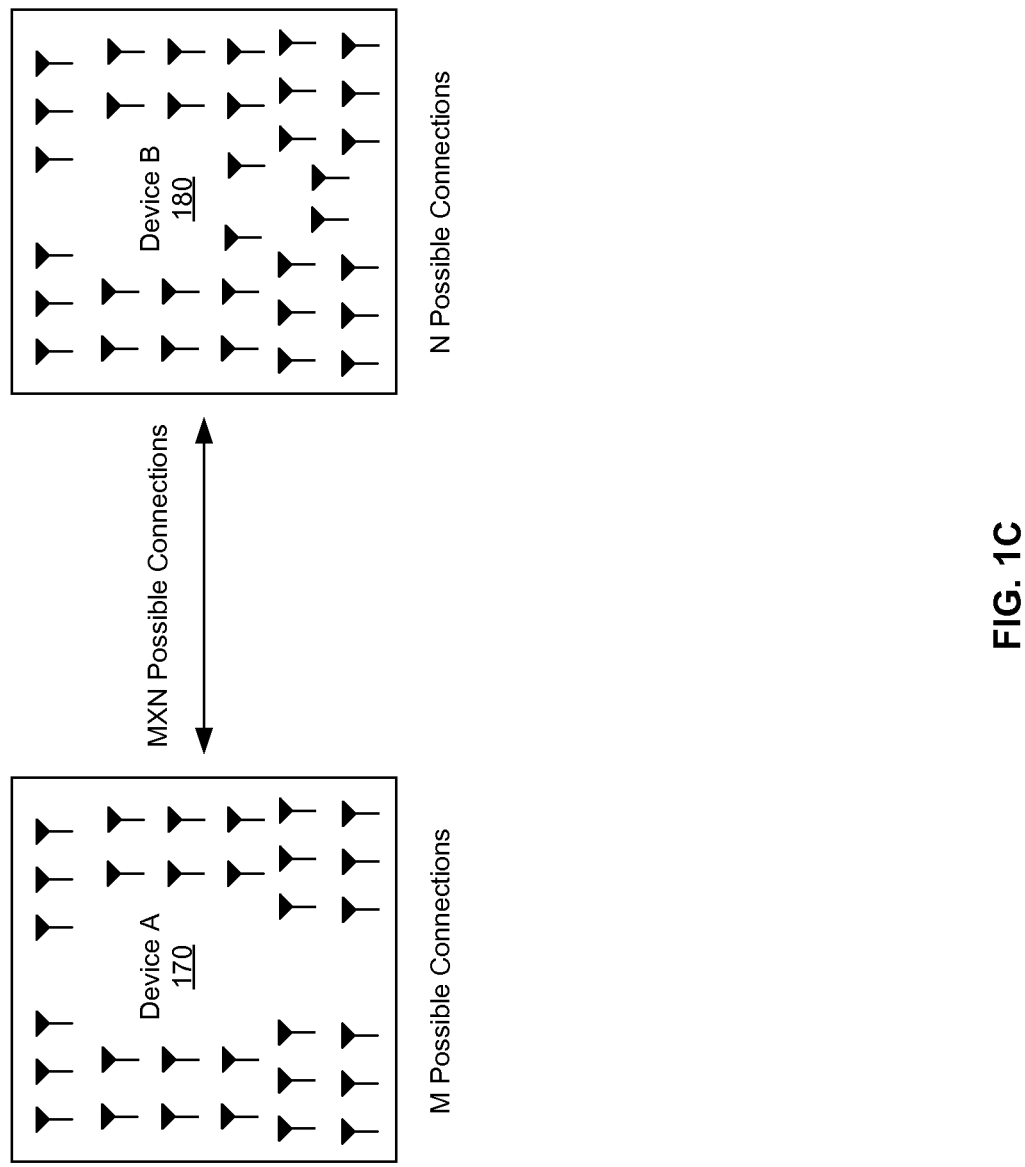
FIG. 1C is a block diagram illustrating exemplary pseudo beamforming, in accordance with an embodiment of the invention.

FIG. 1C is a block diagram illustrating exemplary pseudo beamforming, in accordance with an embodiment of the invention. Referring to FIG. 1C, there is shown two devices, device A 170 and device B 180, each comprising a plurality of antennas. The device A may comprise M antennas, thereby enabling M possible connections to device A 170 and device B 180 may comprise N antennas thereby enabling N possible connections to device B 180. Accordingly, there may be MXN possible connections between the device A 170 and the device B 180.

A plurality of antennas in each of the devices may be utilized to establish a wireless connection, which may enable beamforming. Accordingly, each of the antennas may be driven by RF modules that up-convert an IF signal communicated to the RF modules via one or more coaxial lines. The RF modules may incorporate a different phase delay to each of the up-converted signals depending on the location of the antenna with respect to the receiving device, to enable a uniform beamfront in the transmitted signal.

Figure 2:
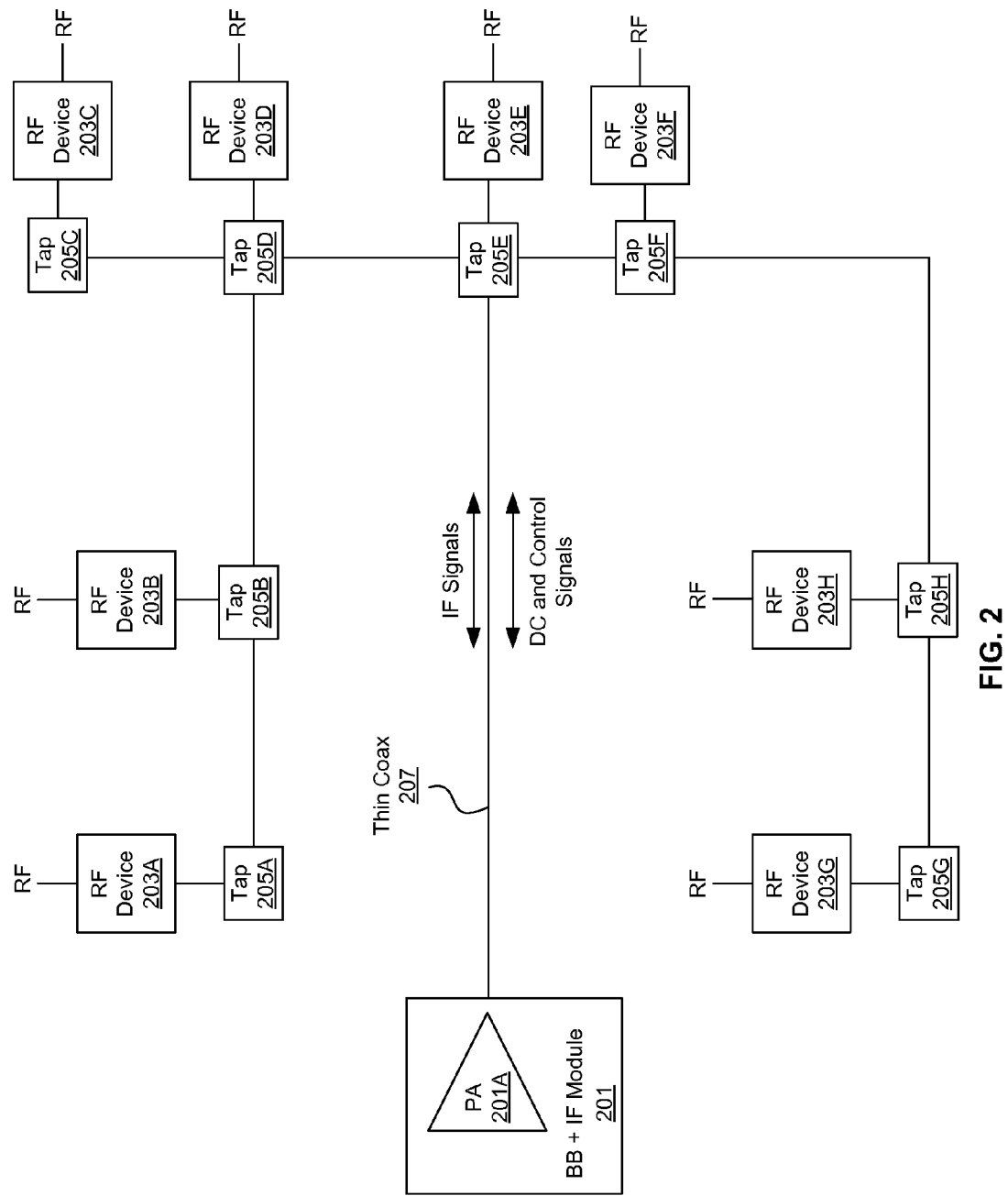
FIG. 2 is a block diagram illustrating an exemplary 60 GHz communication system, in accordance with an embodiment of the invention.

FIG. 2 is a block diagram illustrating a 60 GHz communication system, in accordance with an embodiment of the invention. Referring to FIG. 2, there is shown a baseband and IF module 201, RF devices 203A-203H, taps 205A-205H, and thin coaxial line 207.

The baseband and IF module 201 may comprise suitable circuitry, logic, interfaces, and/or code that may be operable to generate IF signals comprising baseband data. The baseband and IF module 201 may comprise one or more processors, such as a baseband processor, memory, and frequency conversion devices, for example. The processor or processors in the baseband and IF module 201 may be any suitable processor or controller such as a CPU, DSP, ARM, or any type of integrated circuit processor, and may be enabled to update and/or modify programmable parameters and/or values in a plurality of components, devices, and/or processing elements in the baseband and IF module 201. At least a portion of the programmable parameters may be stored in memory, such as the host memory 111*d,* for example, or dedicated memory in the baseband and IF module 201.

The RF devices 203A-203H may comprise suitable circuitry, logic, interfaces, and/or code that may be operable to convert received IF signals to RF frequencies and transmit the RF signals via one or more antennas. The RF devices 203A-203H may be configured remotely throughout a wireless communication device, such as the host device 110*a,* described with respect to FIG. 1, so that 60 GHz signals may be communicated from a plurality of directions, depending on the location of a device that is the intended receiving device. By incorporating frequency up-conversion capability in the RF devices 203A-203H, IF signals may be communicated from a single high power PA in the baseband and IF module 201 via the thin coaxial line 207.

The taps 205A-205H may comprise suitable circuitry, logic, interfaces, and/or code that may be operable to couple a portion of the IF signal being communicated via the thin coaxial line 207 to the associated RF devices 203A-203H. In this manner, taps may be configured to couple signals when it may be desired to transmit RF signals via one or more of the RF devices 203A-203H.

The thin coaxial line 207 may comprise coaxial conductors separated by a dielectric material, for example, and may be operable to communicate IF signals throughout a device, such as the host device 110*a*. In another embodiment of the invention, the thin coaxial line 207 may be operable to provide DC power for various devices within the host device 110*a,* such as the RF devices 203A-203H.

In operation, the baseband and IF module 201 may process baseband signals for transmission via the RF devices 203A-203H. The baseband signals may be up-converted to IF and amplified by a PA prior to communication via the thin coaxial line 207, which may distribute the IF signals throughout the device, such as the host device 110*a,* for example. One or more of the taps 205A-205H may be enabled to tap a portion of the communicated IF signals to associated RF devices 203A-203H. The RF devices 203A-203H may up-convert the tapped IF signals to RF frequencies, such as 60 GHz, for example, before transmission via one or more antennas in the RF devices 203A-203H. In this manner, an RF power amplifier is not required at each RF device 203A-203H, which would require more power than by utilizing a single PA 201A at the IF stage in the baseband and IF module 201.

In addition to IF signals to be up-converted and transmitted, the thin coaxial line 207 may communicate low frequency control signals to the RF devices 203A-203H and the taps 205A-205H. The control signals may be utilized to configure which of the taps 205A-205H may be activated to tap off part of the IF signals for transmission by the appropriate RF device 202A-203H. In addition, the control signals may be utilized to configure the up-conversion performed in the RF devices 203A-203H. In this manner, only those RF devices 203A-203H that have antennas in an appropriate direction for a desired receiving device may be activated, further reducing power requirements.

In an exemplary embodiment of the invention, the RF devices 203A-203H may be enabled individually to determine an RSSI for communication between the host device 110*a* and a remote device, such as the receiving device 114A. One or more antennas in the RF devices 203A-203H may be enabled sequentially, or in any desired order, to determine an antenna configuration that results in the maximum received signal strength, for example. The configuration parameters may be communicated utilizing control channels communicated over the thin coaxial line 207, and the measured signal parameters may be communicated back to the baseband and IF module 201 via the same coaxial line. The control channels may reside at different frequencies than the IF signals to enable multi-signal communication over the thin coaxial line 207.

Pseudo beamforming may be enabled by configuring one or more antennas in one or more of the RF devices 203A-203H to communicate signals with a receiving device. For example, in instances where one or more of the RF devices 203A-203 has better signal integrity communicating with a receiving device, such as measured by signal strength, SNR, CNR, and/or BER, that device, or devices, may be utilized to enable beamforming of RF signals.

Each of the RF devices 203A-203H may be operable to incorporate a phase delay when up-converting the received IF signals to RF. In this manner, a uniform wavefront may be generated despite the varying distances between a transmitting antenna and the receiving device.

The signal integrity may be assessed periodically to determine if one or more other RF devices 203A-203H may be capable of communicating signals with better signal strength or bit error rate, for example, where either communicating device has moved. The RF devices 205A-205H and associated antennas may be configured by control signals communicated over the thin coaxial line 207. The control signals may be at a different frequency than the IF signals communicated via the RF device 203A-203F. The control signals may configure the up-conversion frequency and/or a phase of the resulting RF signal by configuring LO signals for up-conversion mixers in the RF devices 203A-203H.

Figure 3:
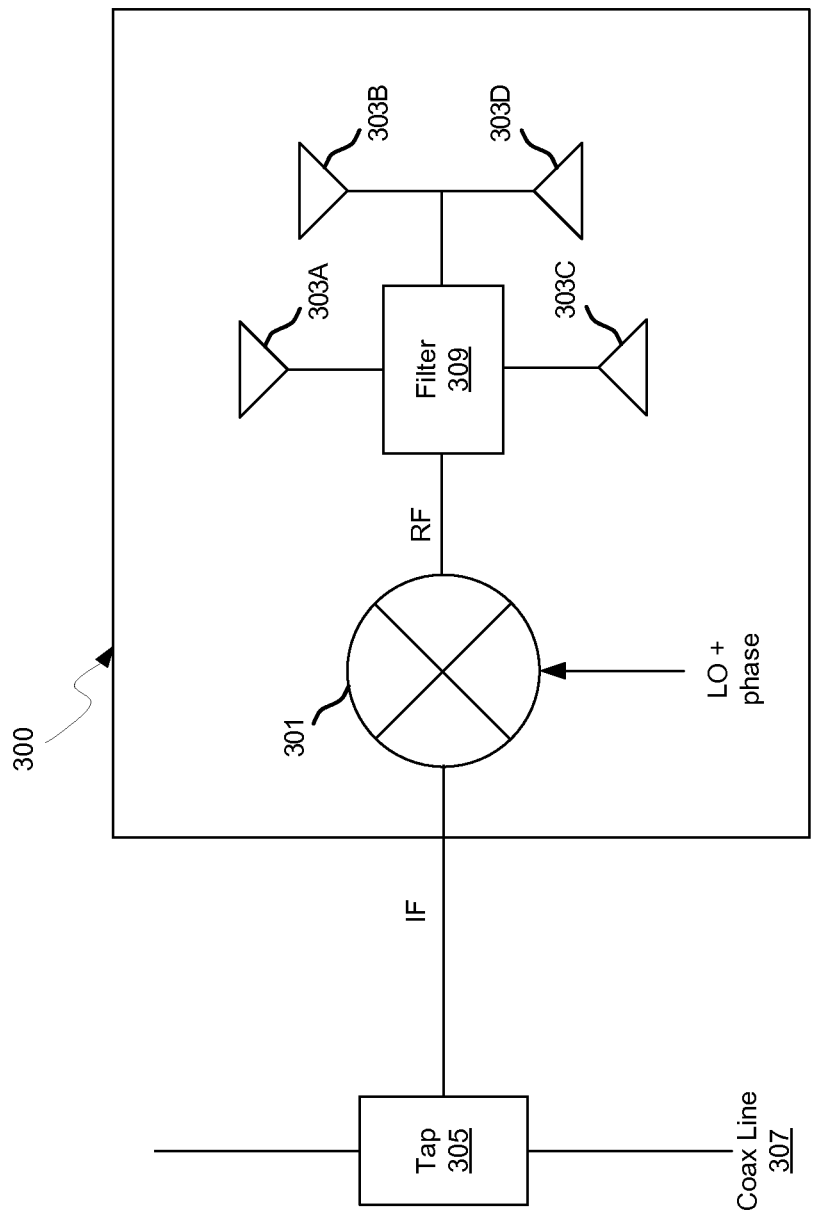
FIG. 3 is a block diagram illustrating an exemplary RF device, in accordance with an embodiment of the invention.

FIG. 3 is a block diagram illustrating an RF device, in accordance with an embodiment of the invention. Referring to FIG. 3, there is shown a tap 305, a coaxial line 307 and an RF device 300 comprising a mixer 301, antennas 303A-303D, and a filter 309. The antennas 303A-303D may comprise antennas operable to transmit and/or receive RF signals, and may be configured with different orientations, for example. The tap 305 and the coaxial line 307 may be substantially similar to the taps 205A-205H and the coaxial line 207 described with respect to FIG. 2.

The mixer 301 may comprise suitable circuitry, logic, interfaces, and/or code that may be operable to frequency shift a received input signal. For example, the mixer 301 may receive an IF input signal and generate an RF output signal. The mixer 301 may also receive as an input signal, an LO signal that may be utilized to up-convert the received IF signal to RF frequencies.

The antennas 303A-303D may be substantially similar to the antennas 120A-120M described with respect to FIG. 1B, and may be operable to communicate RF signals between the host device 110*a*, or the laptop 150, and one or more external devices. The antennas 303A-303D may enable pseudo beamforming, and may thus be selectively enabled depending on the location of the receiving device.

The filter 309 may comprise suitable circuitry, logic, interfaces, and/or code that may be operable to pass signals at a desired frequency range, while attenuating those that are outside of the desired frequency range. The filter may comprise a bandpass filter, lowpass, or a highpass filter, for example. Accordingly, if up-converting to RF, and sum and difference signals are generated by the mixer 301 based on the LO signal and received IF signal, the filter 309 may allow only the high frequency RF signal to pass to the antenna 303, thereby acting as a highpass filter.

In operation, control signals in the coaxial line 307 may configure the tap 305 to tap off a portion of an IF signal communicated via the coaxial line 307 and communicate it to the mixer 301. The LO signal may be utilized to up-convert the IF signal to RF frequencies, and the filter 309 may filter out all but the desired signal at a frequency above a configurable corner frequency of the filter 309. The control signals may also configure the frequency and/or phase of the LO signal, thereby configuring the frequency and/or phase of the RF signal to be communicated.

The filtered RF signal may then be communicated to one or more of the antennas 303A-303D. A desired signal characteristic, such as RSSI or BER, for example, may be utilized to assess the signal received in a plurality of antenna configurations. This may be repeated for each of the antennas 303A-303D as well as for each RF device. In this manner, if one or more of the antennas 303A-303D results in the best signal, that configuration may then be used to communicate RF signals with desired receiving devices.

In an embodiment of the invention, beamforming may be utilized to increase the signal strength of signals that are transmitted to external devices. Accordingly, a plurality of antennas may be enabled to communicate RF signals, each with configurable phase angle to result in a uniform, or other desired beam shape, transmitted signal. In instances where two antennas coupled to the same RF module are enabled, such as the antennas 303A and 303B in the RF module 300, and require a different phase, further tuning of the phase may be provided after the mixer 301, such as in the filter 309, or other delay elements added to the RF module 300.

Figure 4:
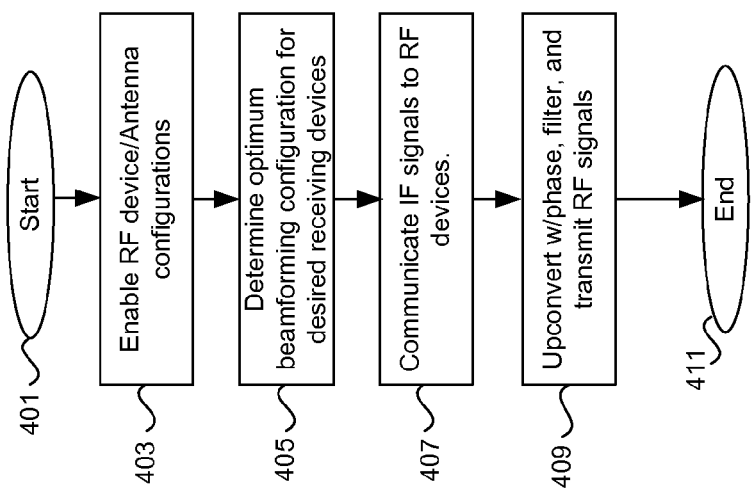
FIG. 4 is a block diagram illustrating exemplary steps in a 60 GHz distributed communication system utilizing pseudo beamforming, in accordance with an embodiment of the invention.

FIG. 4 is a block diagram illustrating exemplary steps in a 60 GHz distributed communication system utilizing pseudo beamforming, in accordance with an embodiment of the invention. Referring to FIG. 4, after start step 401, in step 403, RF devices may be enabled. In step 405, the optimum beamforming configuration or configurations may be determined for the desired receiving device or devices. The optimum beamforming configuration may be determined based on, for example, CNR, CINR, SN, SINR, throughput, BER, PER, FER, QoS, latency, and/or signal strength. In step 407, baseband signals may be up-converted to IF before being communicated to the optimum RF device or devices. In step 409, the RF signals may be up-converted to RF with appropriate phase and transmitted by the enabled antennas for desired beamforming in the RF devices, followed by end step 411.

In an embodiment of the invention, a method and system may comprise configuring a plurality of antennas 120A-120M and 303A-303D in the plurality of remote RF modules 203A-203H and 300 for beamforming transmitted signals. Each of the plurality of remote RF modules 203A-203H and 300 may receive IF signals via one or more coaxial lines 207 and 307. The beamformed RF signals may be transmitted via the plurality of antennas 120A-120M and 303A-303D to one or more receiving devices 114A, 180 that are external to the wireless communication device 110a, 150. The IF signals in the one or more coaxial lines 207 and 307 may be tapped at taps 205A-205H coupled to the plurality of remote RF modules 203A-203H and 300. The RF signals may be generated from IF signals from one or more baseband signals. The plurality of remote RF modules 203A-203H and 300 may be configured utilizing a processor 111c in the wireless communication device 110a, 150. The baseband signals may comprise one or more of video data, streamed Internet data, or data from a local data source. The beamformed RF signals may be transmitted to a receiving device 114A. Control signals for the plurality of remote RF devices 203A-203H and 300 may be communicated utilizing the one or more coaxial lines 207 and 307. The plurality of remote RF devices 203A-203H and 300 may be selected for the beamforming based on a direction to a receiving device 114A for the transmitted beamformed RF signals. The beamforming may comprise adding a phase shift in upconverting the IF signals to the RF signals, which may comprise 60 GHz signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a 60 GHz communication device comprising multi-location antennas for pseudo-beamforming.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:

in a wireless communication device comprising a body and a plurality of remote RF modules within said body of said wireless communication device, selecting one or more of said plurality of remote RF modules based on a physical orientation of a respective antenna in each of said one or more of said plurality of remote RF modules;

configuring said respective antenna in each of said one or more of said plurality of remote RF modules for beamforming transmitted signals, wherein each of said plurality of remote RF modules receive one or more amplified IF signals that have been amplified in a final stage power amplifier and conveyed as one or more analog signals via one or more coaxial lines within said body of said wireless communication device;

directly upconverting the one or more amplified IF signals to RF signals;

beamforming the RF signals and transmitting the beamformed RF signals, via said plurality of antennas, to one or more devices that are external to said wireless communication device; and communicating control signals for said plurality of remote RF modules utilizing said one or more coaxial lines on a frequency different than the one or more amplified IF signals.

2. The method according to claim 1, comprising tapping said one or more amplified IF signals in said one or more coaxial lines at taps coupled to said plurality of remote RF modules.

3. The method according to claim 1, comprising generating said RF signals from the one or more amplified IF signals from one or more baseband signals.

4. The method according to claim 1, comprising configuring said plurality of remote RF modules utilizing a processor in said wireless communication device.

5. The method according to claim 3, wherein said One or more baseband signals comprise one or more of video data, streamed Internet data, or data from a local data source.

6. The method according to claim 1, comprising transmitting said beamformed RF signals to a display device.

7. The method according to claim 1, comprising selecting one or more said plurality of remote RF modules for said beamforming based on a direction to a receiving device for the transmitted beamformed RF signals.

8. The method according to claim 1, wherein said directly upconverting comprises adding a phase shift to said one or more amplified IF signals.

9. The method according to claim 1, wherein said RF signals comprise 60 GHz signals.

10. The method of claim 1, wherein said beamforming is configured in baseband before said each of said plurality of remote RF modules receive said one or more amplified IF signals.

11. The method of claim 1, wherein said final stage power amplifier is a single power amplifier.

12. A system for wireless communication, the system comprising:

one or more circuits in a body of a wireless communication device, said one or more circuits are configured to amplify one or more IF signals with a final stage power amplifier;

enable one or more antenna configurations in one or more of a plurality of remote RF modules within said body of said wireless communication device to beamform transmitted signals based on a physical orientation of a respective antenna in each of said one or more of said remote RF modules, wherein said remote RF modules directly upconvert the one or more amplified IF signals to RF signals, the one or more amplified IF signal being generated from baseband signals and conveyed as one or more analog signals via one or more coaxial lines within said body of said wireless communication device;

beamform the RF signals, and transmit the RF signals as beamformed time division duplexed RF signals via said one or more antenna configurations to one or more devices external to said wireless communication device, wherein said one or more circuits are configured to communicate control signals for said plurality of remote RF modules utilizing said one or more coaxial lines on a frequency different than the one or more amplified IF signals.

13. The system according to claim 12, wherein said one or more circuits are operable to tap said one or more amplified IF signals in said one or more coaxial lines at taps coupled to said plurality of remote RF modules.

14. The system according to claim 12, wherein said one or more circuits are operable to generate said RF signals from the one or more amplified IF signals from one or more baseband signals.

15. The system according to claim 12, wherein said one or more circuits are operable to configure said plurality of remote RF modules utilizing a processor in said wireless communication device.

16. The system according to claim 14, wherein said baseband signals comprise one or more of video data, streamed Internet data, or data from a local data source.

17. The system according to claim 12, wherein said one or more circuits are configured to transmit the beamformed time division duplexed RF signals to a display device.

18. The system according to claim 12, wherein said one or more circuits are configured to select said one or more of said plurality of remote RF modules based on a direction to a receiving device for the transmitted beamformed time division duplexed RF signals.

19. The system according to claim 12, wherein said one or more circuits are configured to add a phase shift when the one or more amplified IF signals are directly upconverted to said RF signals.

20. The system according to claim 12, wherein said RF signals comprise 60 GHz signals.

21. The system of claim 12, wherein said beamforming is configured in said baseband signals before said remote RF modules receive said IF signals.

22. The system of claim 12, wherein said final stage power amplifier is a single power amplifier.

* * * * *